(12) United States Patent
Homma (10) Patent No.: US 10,949,592 B1
(45) Date of Patent: Mar. 16, 2021

(54) CO-SIMULATION EXECUTION PLATFORM (71) Applicant: Hitachi Automotive Systems, Ltd., Ibaraki (JP)

(72) Inventor: Ichiki Homma, West Bloomfield, MI (US)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/826,603

(22) Filed: Mar. 23, 2020

(51) Int. Cl.
*G06F 30/3312* (2020.01)
*G06F 117/08* (2020.01)

(52) U.S. Cl.
CPC ...... *G06F 30/3312* (2020.01); *G06F 2117/08* (2020.01)

(58) Field of Classification Search
CPC .......... G06F 9/455; G06F 30/20; G06F 30/33; G06F 30/3308; G06F 30/3312; G06F 2217/08

USPC .......................................... 716/106, 108, 113
See application file for complete search history.

(56) References Cited

U.S. PATENT DOCUMENTS

| | | | | |
|---|---|---|---|---|
| 2003/0149796 | A1* | 8/2003 | Emerson | H04L 63/105 709/250 |
| 2006/0155879 | A1* | 7/2006 | Shih | G06F 13/385 710/1 |
| 2010/0011237 | A1* | 1/2010 | Brooks | G06F 9/45537 713/502 |
| 2010/0034236 | A1* | 2/2010 | Ploechinger | G01L 21/14 374/45 |

* cited by examiner

*Primary Examiner* — Paul Dinh
(74) *Attorney, Agent, or Firm* — Procopio, Cory, Hargreaves & Savitch LLP (57) ABSTRACT

Example implementations described herein are directed to resolving issues related to the processor model in the S-PILS (Simulated Processor In the Loop Simulation) system, such as processor model correctness and simulation execution speed, by using the actual Central Processing Unit (CPU) board with silicon CPU instead of the virtual SoC model in the S-PILS.

12 Claims, 8 Drawing Sheets

CO-SIMULATION EXECUTION PLATFORM

BACKGROUND

Field

The present disclosure is generally directed to hardware simulation systems, and more specifically, to co-simulation execution platforms.

Related Art

In automotive systems such as Advanced Driver Assistance systems (ADAS), there is a strong demand for optimization of verification procedure for embedded software of the system.

An example related art implementation to that is used as the solution for such demand is the "co-simulation on virtual platform" also known as "S-PILS (Simulated Processor In the Loop Simulation)", a multi-domain simulation connecting same or different types of simulators which represent each part of the simulation target (e.g. Electronic Control Unit (ECU), electronic circuit, mechanical plant, and so on).

This kind of system provides a virtual platform that can run embedded software (aka firmware (F/W)) and verify its behavior without using any real hardware, but rather relies on the virtual environment on personal computers (PCs), so that software designers can check and verify the software fairness even before hardware platform development.

Figure 2:
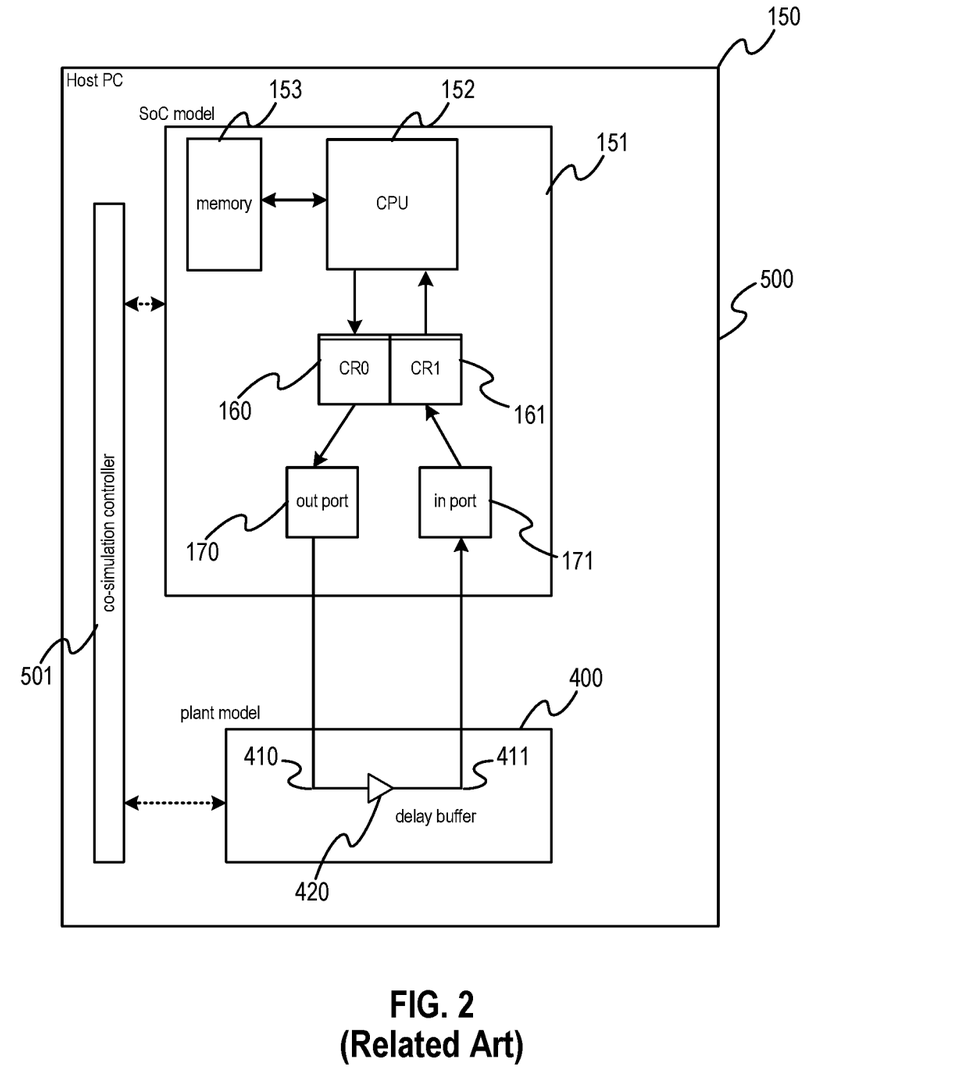
FIG. 2 illustrates an example related art implementation of a virtual co-simulation platform on S-PILS.

FIG. 2 illustrates an example related art implementation of a virtual co-simulation platform on S-PILS. The system of FIG. 2 involves with prior methodology, which involves a Host PC (150) which can include a System on Chip (SoC) model (151). The SoC model (151) can include a Central Processing Unit (CPU) model (152), memory (153), control register 0 (CR0) (160) and 1 (CR1) (161), out port (170) and in port (171). The system further involves a plant model (400) which includes input (410), delay buffer (420) and output (411), and a co-simulation controller (501). The Host PC (150) is an execution platform for all of the components of the S-PILS system such as CPU (151), plant model (400) and co-simulation controller (501).

The SoC model (151) is an execution model for the test target firmware (F/W). The F/W is stored in the memory (153) and executed by the CPU model (152) step by step to emulate the actual execution process of the F/W.

The SoC model (151) also has control registers CR0 (160) and CR1 (161) to communicate with the outside environment via out port (170) and in port (171). The F/W can send an output signal to the outside with writing 0 or 1 to the CR0 (160) and the value is sent immediately to the outside via out port (170). The F/W can also receive the input signal coming from the outside by reading CR1 (161) which reflects the value of 0 or 1 of the input port (171) immediately.

The plant model (400) presents a certain plant model which is connected to the SoC model (151) to facilitate the co-simulation. In this example, the plant model has input (410) which connected to the out port (170), output (411) which connected to the in port (171), and a delay buffer (420) which reflects the value of its input (410) to the value of its output (411) with a certain fixed delayed time.

The co-simulation controller (501) is a program process which manages the whole co-simulation execution procedure step by step. The execution procedure is described further herein.

Figure 3:
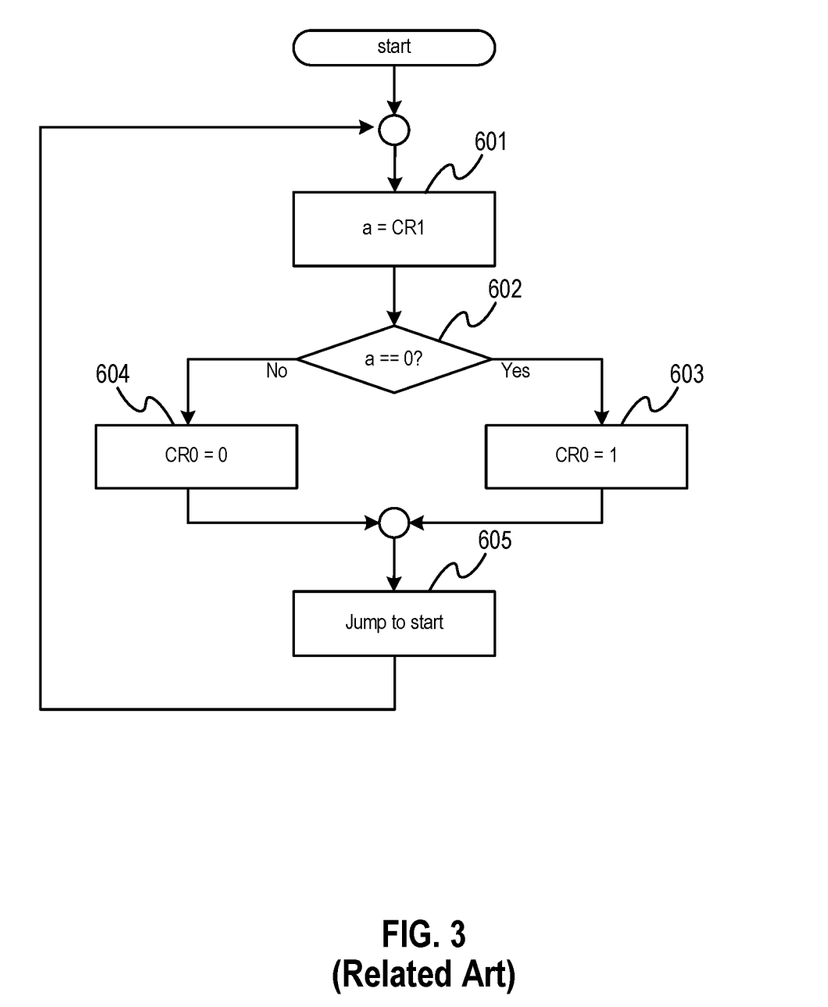
FIG. 3 illustrates an example related art implementation of test target F/W which is executed on the CPU model in the SoC model.

FIG. 3 illustrates an example related art implementation of test target F/W which is executed on CPU model (152) in the SoC model (151). After the F/W is invoked from "start", it reads CR1 (161) to retrieve in port (171) value and stores into its local variable "a" at first step (601). Next (602), it compares the local variable "a" to see if it is "0" or not. If it equals to "0" (Yes), the next step will be (603) and if "1" (No), the next step will be (604).

At the step (603), the F/W sets CR0 (160) to "1". At the step (604), the F/W sets CR0 (160) to "0" respectively. The next step for both (603) and (604) is the same (605). At the step (605), the F/W jumps to the step (601) to redo the same procedure again. As shown in FIG. 3, the entire process is an infinite loop.

Figure 4:
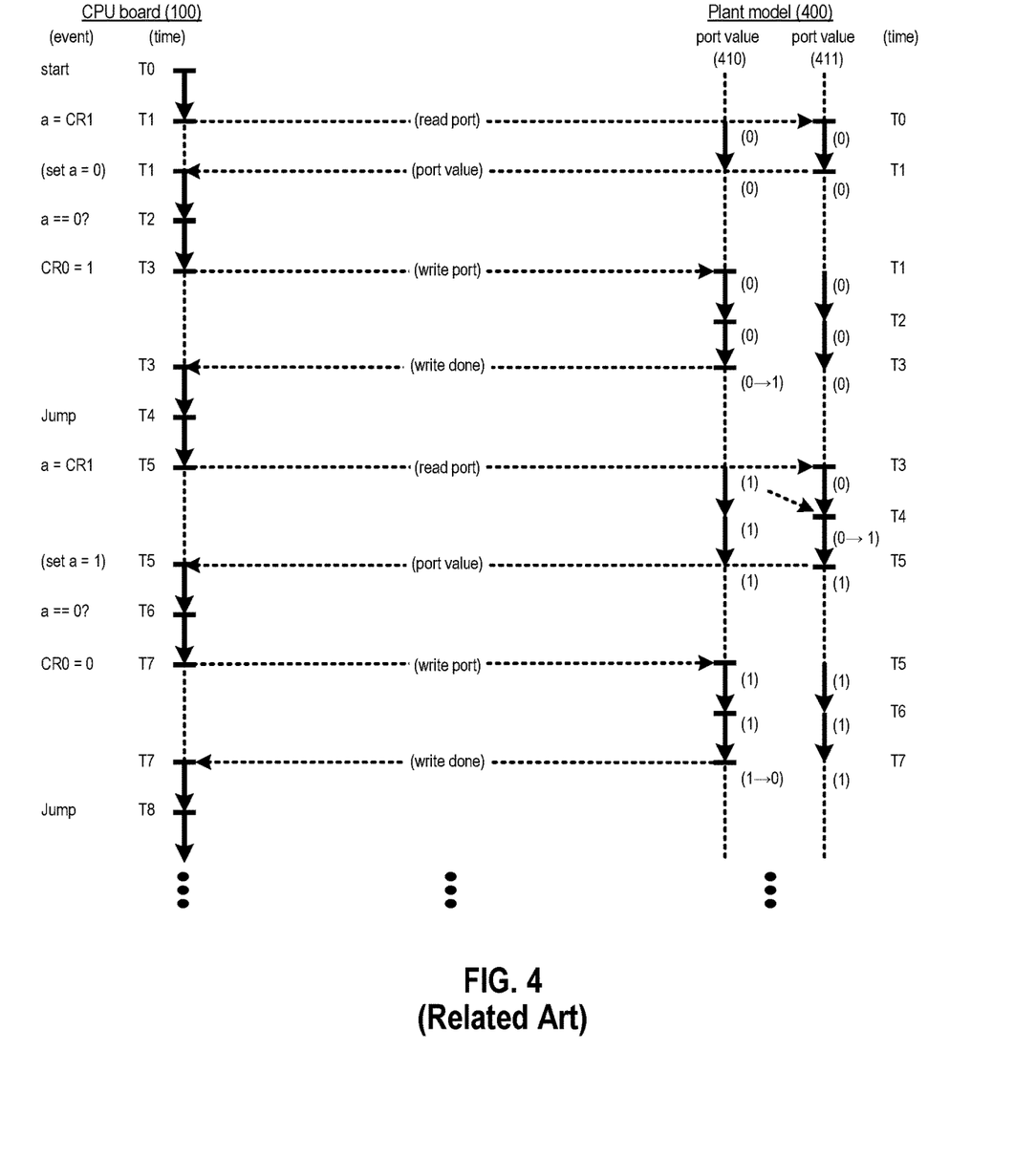
FIG. 4 describes the execution timing chart of the co-simulation on the platform shown in FIG. 2 with the test target F/W shown in FIG. 3.

FIG. 4 describes the execution timing chart of the co-simulation on the platform shown in FIG. 2 with the test target F/W shown in FIG. 3. The execution procedure is as follows.

At the initial state, SoC model (150) and plant model (400) are both at time T0. Further, the initial value of CR0 (160) is "0" and, therefore, out port (170), input (410), output (411), in port (171) and CR1 (161) are all "0". When the co-simulation is invoked, the co-simulation controller (501) invokes the SoC model (151) first but the plant model (400) is stopped (i.e., will not change its state). The SoC model (151) executes the F/W step (601) at the time of T1.

At the step (601) the F/W reads CR1 (161), so it needs to retrieve the value of the CR1 (161) at the time of T1. To do so, the co-simulation controller (501) suspends the SoC model (150) execution and switches the execution to the plant model (400) because the state of the plant model (400) needs to be updated. The plant model (400) is then activated and updates the values of its input (410) and output (411) step by step until it reaches the time of T1. All of the values are "0" so when the plant model (400) reached to the time of T1, it returns the output value (411) to the SoC model (150).

After the plant model (400) reaches to the time of T1, the co-simulation controller (501) switches the SoC model (150) as an active again. As the result, local variable "a" is set to "0" at the F/W step (601). The SoC model (151) steps into the next step (602) at T2 to compare the contents of the local variable "a" with immediate value "0". In this case "a" is equal to "0" so the next step will be (603). The SoC model (151) writes "1" to the CR0 (160) as shown in the step (603) at T3. This procedure changes the value of out port (170) from 0 to 1. Thus, the co-simulation controller (501) suspends the SoC model (151) and activates the plant model (400) to update the state. The plant model (400) is now at T1 so it updates its input (410) and output (411) from T1→T2→T3 step by step to follow the timing of SoC model (151). As a result, the value of input (410) changes from "0" to "1" at time of T3.

After the plant model (400) reaches to time T3, the co-simulation controller (501) suspends the plant model (400) and activates the SoC model (150) again. The SoC model (151) executes the step (605) to jump back to the step (601) again as shown in FIG. 3 at T4. Then the SoC model (151) executes the F/W step (601) at the time of T5.

At the step (601) the F/W reads CR1 (161), so it needs to retrieve the value of the CR1 (161) at the time of T5. To do so, the co-simulation controller (501) suspends the SoC model (150) execution and switch the execution to the plant model (400) because the state of the plant model (400) is needed to be updated. The plant model (400) is then activated and updates the values of its input (410) and output (411) step by step until it reaches the time of T5. As the input (410) is now "1", the value of output (411) is updated from "0" to "1" at the time of T4 and retains the value "1" at T5.

After the plant model (400) reaching to the time of T5, the co-simulation controller (501) switch the SoC model (150) as an active again. As the result, local variable "a" is set to "1" at the F/W step (601). The SoC model (151) steps into the next step (602) at T6 to compare the contents of the local variable "a" with immediate value "0". In this case "a" is equal to "1" so the next step will be (604). The SoC model (151) writes "0" to the CR0 (160) as shown in the step (604) at T7.

This procedure changes the value of out port (170) from 1 to 0, so the co-simulation controller (501) suspends the SoC model (151) and activates the plant model (400) to update the state. The plant model (400) is now at T5 so it updates its input (410) and output (411) from T5→T6→T7 step by step to follow the timing of SoC model (151). As a result, the value of input (410) changes from "1" to "0" at time of T7.

After the plant model (400) reaches the time T7, the co-simulation controller (501) suspends the plant model (400) and activates the SoC model (150) again. The SoC model (151) executes the step (605) to jump back to the step (601) again as shown in FIG. 3 at T8. The rest of the execution procedure is the same as described.

SUMMARY

There are several issues for using an S-PILS system, which are mostly related to the processor model in the platform. One of the issues is that there is no guarantee that the virtual processor model behavior coincides with that of the actual silicon processor because the processor model is usually built independently from the actual development of the processor. That is, the model is usually programmed separately from the actual processor development.

Another issue with the related art is the execution speed. The simulator has to emulate all parts of the processor model one by one for each and every simulation execution step. In general, the execution speed is very slow compared to the actual processor because there are so many component parts within the processor model that need to be emulated.

The example implementations described herein are directed through addressing the above issues with the related art implementations through a new methodology to resolve the issues related to the processor model in the S-PILS system, such as processor model correctness and simulation execution speed.

In example implementations described herein, there is an actual (physical) central processing unit (CPU) board, which includes a CPU, memory, timer and interface (I/F) logic to execute the target F/W to be tested and to communicate with a Host personal computer (PC) outside of the CPU board. The Host PC can involve an I/F to communicate with the CPU board above, an Input/Output (I/O) thread program which handles the actual communication between the CPU board and the Host PC, which involves an I/F communication function, pseudo control registers, and I/O ports, a plant model which emulates the behavior of the plant that cooperates with the F/W on the CPU board, and a co-simulation controller which manages the execution of the co-simulation of the whole system.

Aspects of the present disclosure involve a co-simulation platform system, which can include a central processing unit (CPU) board having a memory configured to store firmware; a CPU configured to execute the firmware; and a timer configured to calculate event occurrence timing during execution of the firmware; and a host computer connected to the CPU board via an interface (I/F), the host computer involving a processor configured to execute a virtual plant model on a simulation engine. The firmware is configured to control the virtual plant model, and the processor and the CPU are configured to synchronize with the event occurrence timing calculated by the timer to execute co-simulation between the virtual plant model and the firmware.

Aspects of the present disclosure involve a co-simulation platform system, involving a central processing unit (CPU) board having a memory configured to store firmware, a CPU configured to execute the firmware, and a timer configured to calculate event occurrence timing during execution of the firmware; and a host computer connected to the CPU board via an interface (I/F), the host computer involving a processor configured to execute a virtual plant model on a simulation engine; wherein the firmware is configured to control the virtual plant model; wherein the processor and the CPU are configured to synchronize with the event occurrence timing calculated by the timer to execute co-simulation between the virtual plant model and the firmware.

Aspects of the present disclosure further involve a host computer connected, via an interface (I/F) to a central processing unit (CPU) board having a memory configured to store firmware, a CPU configured to execute the firmware, and a timer configured to calculate event occurrence timing during execution of the firmware, the host computer involving a processor configured to execute a virtual plant model on a simulation engine; wherein the firmware is configured to control the virtual plant model; wherein the processor and the CPU are configured to synchronize with the event occurrence timing calculated by the timer to execute co-simulation between the virtual plant model and the firmware.

Aspects of the present disclosure involve a co-simulation platform system, involving a central processing unit (CPU) board having means for storing firmware, means for executing the firmware, and means for calculating event occurrence timing during execution of the firmware; and a host computer connected to the CPU board via an interface (I/F), the host computer involving means for executing a virtual plant model on a simulation engine; wherein the firmware is configured to control the virtual plant model; and means for synchronizing the host computer and the CPU board with the event occurrence timing to execute co-simulation between the virtual plant model and the firmware.

Through use of the system as described above, the execution of the system can be facilitated such that when the F/W executed on the CPU board has an access to such control registers in the I/O thread, the CPU board communicates the I/O thread in the Host PC with the time of the occurrence so that the I/O thread and plant model can emulate their logical behavior under the control of the co-simulation controller until the time of such access occurrence.

Through the example implementations described herein, the test target F/W can thereby be executed on the actual CPU board instead of a virtual processor. Thus, the behavior of the F/W is exactly the same as the actual execution in the real world. Further, the execution of the whole co-simulation is faster than that of the S-PILS system, because the F/W execution speed is exactly the same as in the real world and, in general, can operate faster than the virtual processor model. Such example implementations lead to more effective co-simulation execution than the related art implementations.

DETAILED DESCRIPTION

The following detailed description provides details of the figures and embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Embodiments as described herein can be utilized either singularly or in combination and the functionality of the embodiments can be implemented through any means according to the desired implementations.

Figure 1:
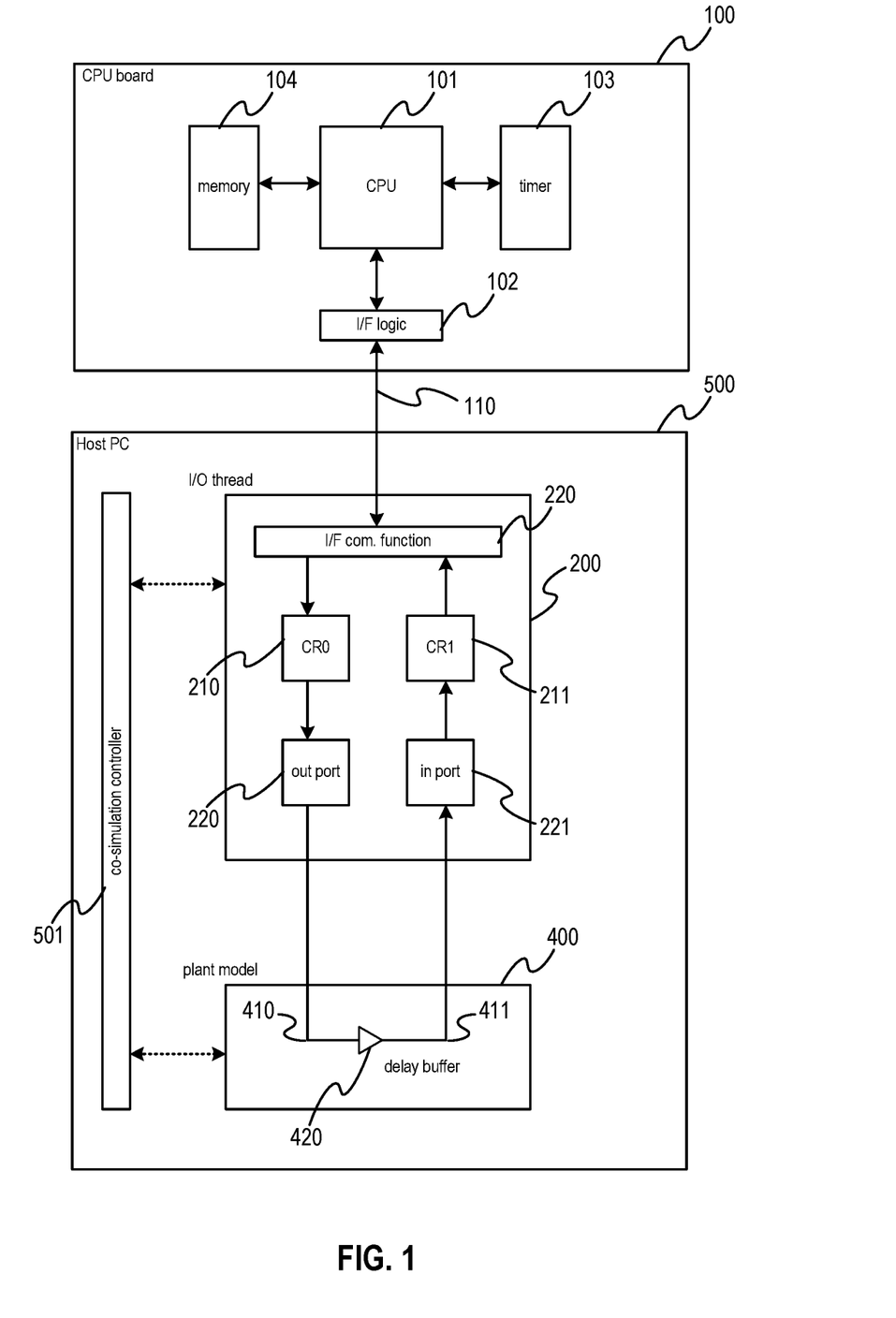
FIG. 1 illustrates an example of co-simulation platform, in accordance with an example implementation.

FIG. 1 illustrates an example of co-simulation platform, in accordance with an example implementation. The platform can involve a CPU board (100) which involves a CPU (101), I/F logic (102), timer (103), memory (104) and I/F path (110). Host PC (150) involves I/O thread (220) which includes I/F communication function (220), control register CR0 (210) and CR1 (211), out port (220) and in port (221), a plant model (400) which involves of input (410), delay buffer (420) and output (411), and co-simulation controller (501).

The CPU board (100) is an execution platform for the test target F/W. The F/W is stored in the memory (104) and executed by the CPU (101) step by step for the F/W testing. The CPU board (100) has I/F logic (102), which establishes a connection between the CPU board (100) and Host PC (500) via I/F path (110) so that it can send and/or receive certain data at certain timing, and also can communicate with co-simulation controller (501) so that the co-simulation controller (501) can manage the execution step of the CPU board (100) during the co-simulation.

CPU board (100) also has a timer (103) which can measure the event occurrence time during F/W execution, such as control register read/write, and others. The detailed implementation of the timer (103) is described further herein.

The I/O thread (220) is a program process running on the Host PC (500), and is connected to the CPU board (100) via I/F path (110). The path can be facilitated, for example, by Universal asynchronous receiver-transmitter (UART) serial communication, ether network or others, in accordance with the desired implementation.

The I/O thread (220) also has its pseudo control registers CR0 (210) and CR1 (211) to communicate the plant model (400) via out port (220) and in port (221). The F/W can send an output signal to the plant model (400) through writing 0 or 1 to the CR0 (210) wherein the value is sent immediately to the plant model (400) via out port (220). The F/W can also receive input signal coming from the plant model (400) by reading CR1 (211) which reflects the value of 0 or 1 of the input port (221) immediately.

The I/O thread (220) can communicate with the CPU board (100) via the I/F path (100) to write a new value into CR0 (210) or to read a value from CR1 (211). This communication and read/write access can be done by I/F communication function (220).

The plant model (400) presents a certain plant model which is connected to the I/O thread (200) to facilitate the co-simulation. In this example, the plant model has input (410) which is connected to the out port (170), output (411) which is connected to the in port (171), and a delay buffer (420) which reflects the value of its input (410) to the value of its output (411) with a certain time delay.

The co-simulation controller (501) is a program process which manages the whole co-simulation execution procedure step by step. The execution procedure is described further herein.

The Host PC (500) is an execution platform for all of the components of the S-PILS system with the exception of the components on the CPU board (100) such as (200), (400) and (501).

Figure 5:
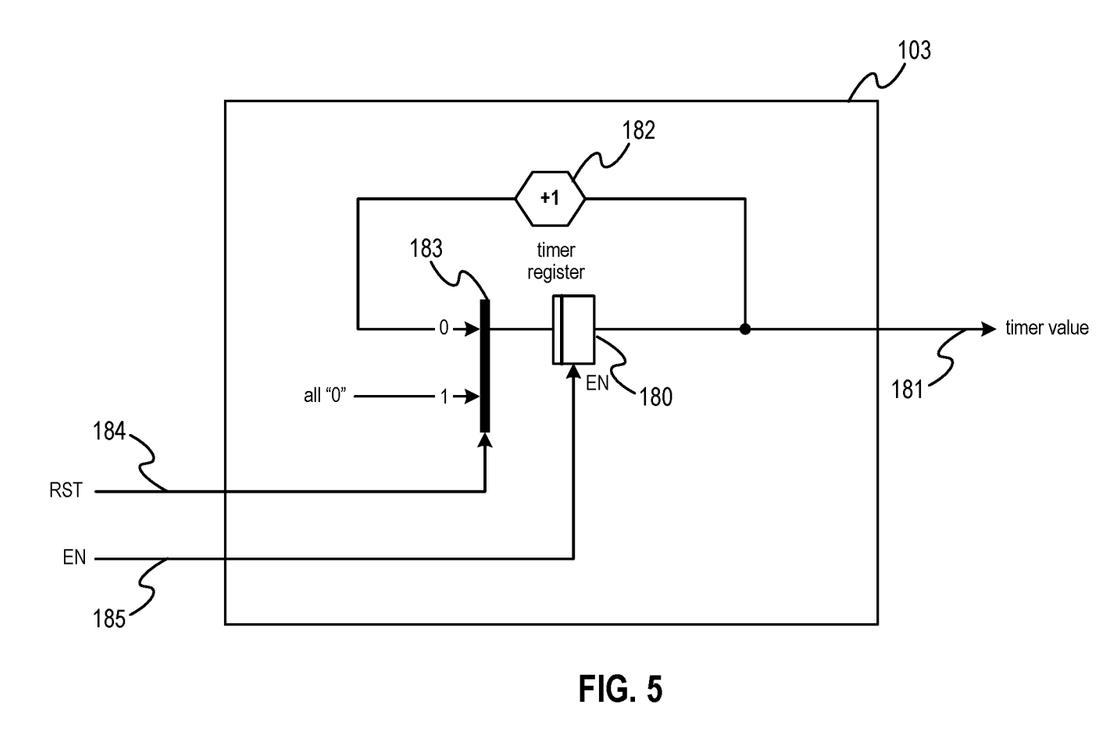
FIG. 5 is an example implementation of the timer.

FIG. 5 is an example implementation of the timer (103). The timer (103) can be implemented by logic on a FPGA (Field Programmable Gate Array) or by a software routine depending on the desired implementation. It may also be facilitated by the pre-installed logic in the CPU board (100) or CPU (101), in the form of a performance counter. The timer (103) involves a timer register (180) configured to hold the current timer value, a timer value output (181) by which the timer value can be read, and an incrementer (182) which provides an increment result (+1) of the current timer value, a selector (183) which selects an increment value (+1) or reset value (i.e., set to all "0"), an RST (reset input) (184) configured to control the selector (183), and an EN (enable input) (185) which controls the on/off of the timer counter update.

The timer (103) usage is as follows:

Before starting the timer (103), the timer (103) has to be reset to the initial value of all "0". To do so, both RST (184) and EN (185) are set to "1" at the same time. After the timer register (180) is set to all "0", RST (184) and EN (185) can be set to "0" again. After the reset, the timer (103) starts counting when the EN (185) is set to "1". The timer register (180) continues to count up its increment (+1) for every step while EN (185) is "1". The EN (185) can be set to "0" again during any timing to suspend the updating of the timer register (180). It can also be set to "1" again in any timing to resume the timer register (180) count up increment (+1).

The timer value (181) can be read for any timing whenever accessed by the F/W. The timer value (181) reflects the time at the certain timing it is read.

Figure 6A:
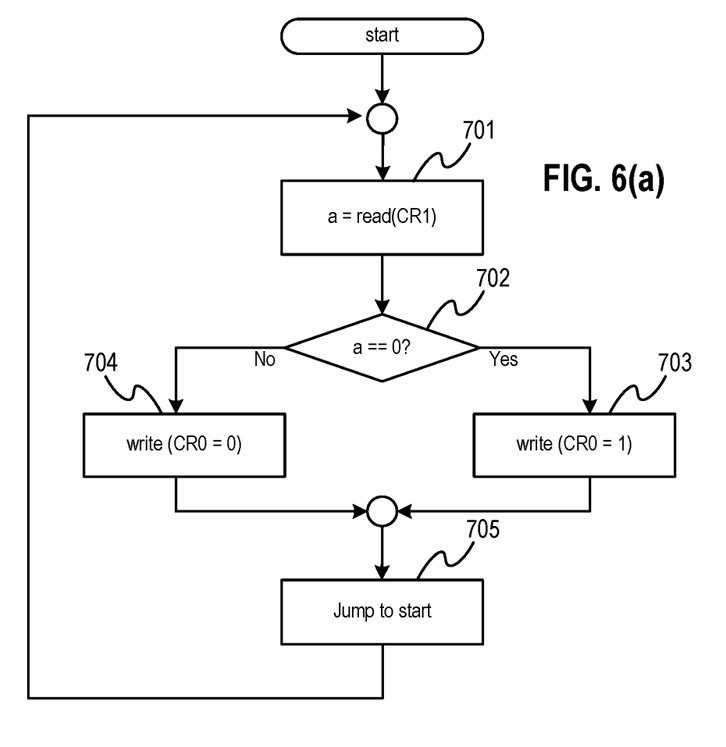
FIGS. 6(a) to 6(c) illustrate an example of the flow for the test target F/W in accordance with an example implementation.
Figure 6B:
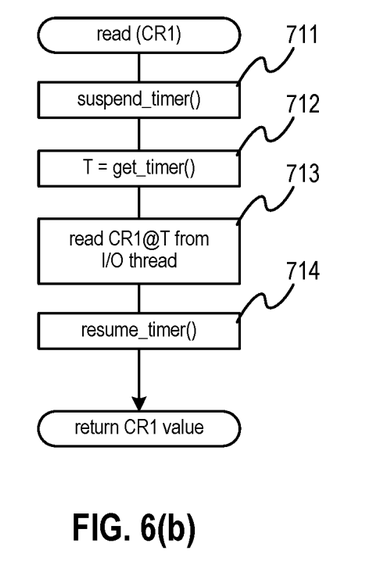
Figure 6C:
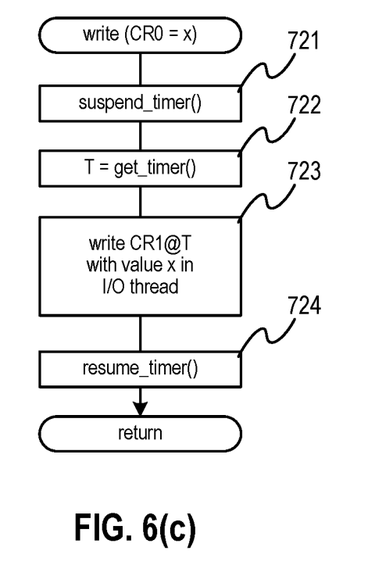

FIGS. 6(a) to 6(c) illustrate an example of the flow for the test target F/W which is executed on the CPU (101) in the CPU board (100), in accordance with an example implementation. The test target F/W is modified from the flow of FIG. 3.

After the F/W is invoked from "start", at the first step (701) the flow reads the CR1 (211) to retrieve in port (221) value, and stores as local variable "a". When the "read (CR1)" function-call in (701) is called, it reads the CR1 (211) as follows:

First, the flow executes "suspend_timer( )" (711) to suspend the timer register count up. Next, the flow reads the timer value (181) with "get_timer( )" at (712) and stores as local variable "T". Then, the flow reads the value of the CR1 (211) at the time of "T" by ordering I/O thread (220) via I/F logic (102) at (713). Finally, the flow resumes the timer register (180) update with "resume_timer( )", and returns the retrieved CR1 (211) value to the caller at (714).

Next (702), the flow compares local variable "a" to see if it is "0" or not. If it equals to "0" (Yes), the flow proceeds to (703) and if "1" (No), the flow proceeds to (704). At the flow (703), the F/W sets CR0 (210) to "1". At the flow (704), the F/W sets CR0 (210) to "0" respectively. Then, the flow proceeds to (705).

When the "write (CR0)" function-call in (703) or (704) is called, the flow writes the CR0 (210) as follows. First, the executes "suspend_timer( )" (721) to suspend the timer register count up. Next, the flow reads the timer value (181) with "get_timer( )" at (722) and stores as local variable "T". Then, the flow writes the value of the CR0 (210) at the time of "T" by ordering I/O thread (220) via I/F logic (102) at (723). Finally, the flow resumes the timer register (180) update with "resume_timer( )", and returns to the caller at (724). At the flow at (705), the F/W jumps to the flow at (701) to redo the same procedure again. As illustrated in FIG. 6(*a*), the entire process is infinite loop.

Figure 7:
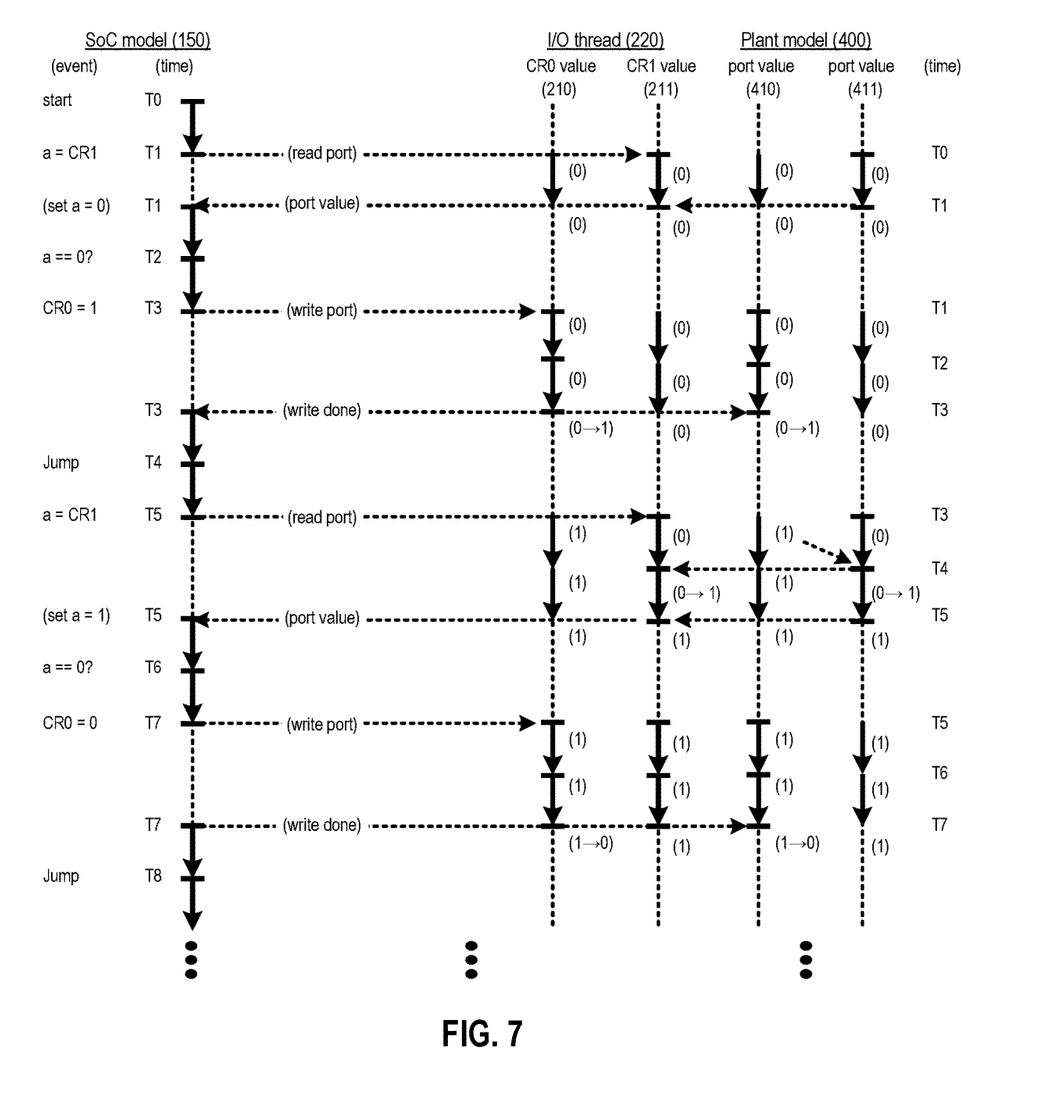
FIG. 7 illustrates the execution timing chart of the co-simulation on the new platform of FIG. 1 with the test target F/W process of FIGS. 6(a) to 6(c), in accordance with an example implementation.

FIG. 7 illustrates the execution timing chart of the co-simulation on the new platform of FIG. 1 with the test target F/W process of FIGS. 6(*a*) to 6(*c*), in accordance with an example implementation. The execution procedure is as follows. At the initial state, CPU board (100), I/O thread (220) and plant model (400) are all at time T0. Also the initial value of CR0 (210) is "0" and thus, out port (220), input (410), output (411), in port (221) and CR1 (211) are all "0".

When the co-simulation is invoked, the co-simulation controller (501) invokes the CPU board (100) first, but the I/O thread (200) and the plant model (400) are halted (i.e., will not change state). The CPU board (100) executes the F/W step (701) at the time of T1. At the step (701), the F/W is about to access the CR1 (211). When the "read (CR1)" in (701) is called, the F/W reads the CR1 (211) as follows.

First, the F/W executes "suspend_timer( )" (711) to suspend the timer register count up. Next, the F/W reads the timer value (181) with "get_timer( )" at (712) and stores it into a local variable "T". In this case, the value is "T1". Then, the F/W reads the value of the CR1 (211) at the time of "T" by ordering I/O thread (220) via I/F logic (102) at (713). Finally, the F/W resumes the timer register (180) update with "resume_timer( )", and returns the retrieved CR1 (211) value to caller at (714).

At step (713), the I/F communication function (220) reads CR1 (211), so it needs to retrieve the value of the CR1 (211) at the time of T1. To do so, the co-simulation controller (501) suspends the CPU board (100) execution and switches the execution to the I/O thread (200) and the plant model (400), because the state of the I/O thread (200) and the plant model (400) need to be updated.

The I/O thread (200) and the plant model (400) are now activated and update the values of their CR0 (210), CR1 (211), out port (220), in port (221), input (410) and output (411) step by step until it reaches the time of T1. All of the values are "0" so when both the I/O thread (200) and the plant model (400) reached to the time of T1, it returns the CR1 value (211) "0" to the CPU board (100).

After the I/O thread (200) and the plant model (400) reach time of T1, the co-simulation controller (501) switches the CPU board (100) back to active again. As a result, local variable "a" is set to "0" at the F/W step (701).

The CPU board (100) executes into the next step (702) at T2 to compare the contents of the local variable "a" with immediate value "0". In this case "a" is equal to "0" so the next step will be (703).

The CPU board (100) writes "1" to the CR0 (210) as shown in the step (703) at T3.

At the step (703) the F/W is about to access the CR0 (210). When the "write (CR0)" function-call in (703) is called, it writes the CR0 (210) as follows. First, the F/W executes "suspend_timer( )" (721) to suspend the timer register count up. Next, the F/W reads the timer value (181) with "get_timer( )" at (722) and stores as local variable "T". In this case, the value is "T3". Then, the F/W writes the value of the CR0 (210) at the time of "T" by ordering I/O thread (220) via I/F logic (102) at (723). Finally, the F/W resumes the timer register (180) update with "resume_timer( )", and returns to the caller at (724).

At step (723), the I/F communication function (220) writes CR0 (210) from 0 to 1. As a result, the value of out port (220) also changes from 0 to 1, so the co-simulation controller (501) suspends the CPU board (100) and activates the I/O thread (200) and the plant model (400) to update the state. The I/O thread (200) and the plant model (400) are now at T1 so they updates their components CR0 (210), CR1 (211), out port (220), in port (221), input (410) and output (411) from T1→T2→T3 step by step to follow the timing of CPU board (100). As a result, the value of the CR0 (210) and the input (410) changes from "0" to "1" at time of T3.

After both the I/O thread (200) and the plant model (400) reach time T3, the co-simulation controller (501) suspends them and switches the CPU board (100) back to active again. The CPU board (100) executes the step (702) to jump back to the step (701) again as shown in FIG. 6(*a*) at T4. Then the CPU board (100) executes the F/W step (701) at the time of T5.

At the step (701) the F/W is about to access the CR1 (211). When the "read (CR1)" in (701) is called, it reads the CR1 (211) as follows. First, the F/W executes "suspend_timer( )" (711) to suspend the timer register count up. Next, the F/W reads the timer value (181) with "get_timer( )" at (712) and stores as local variable "T". In this case, the value is "T5". Then, the F/W reads the value of the CR1 (211) at the time of "T" by ordering I/O thread (220) via I/F logic (102) at (713). Finally, the F/W resume the timer register (180) update with "resume_timer( )", and returns the retrieved CR1 (211) value to caller at (714).

At the step (713) above, the I/F communication function (220) reads CR1 (211), so it has to retrieve the value of the CR1 (211) at the time of T5. To do so, the co-simulation controller (S01) suspends the CPU board (100) execution and switches the execution to the I/O thread (200) and the plant model (400).

The I/O thread (200) and the plant model (400) are now activated and update the values of their CR0 (210), CR1 (211), out port (220), in port (221), input (410) and output (411) step by step until it reaches the time of T5. As the input (410) is now "1", the value of output (411) is updated from "0" to "1" at the time of T4 and keep its same value "1" at T5. When both the I/O thread (200) and the plant model (400) reached to the time of T5, it returns the CR1 value (211) "1" to the CPU board (100).

After the I/O thread (200) and the plant model (400) reaches time T5, the co-simulation controller (501) switch the CPU board (100) as an active again. As the result, local variable "a" is set to "1" at the F/W step (701). The CPU board (100) executes into the next step (702) at T6 to compare the contents of the local variable "a" with immediate value "0". In this case "a" is equal to "1" so the next step will be (704). The CPU board (100) writes "0" to the CR0 (210) as shown in the step (704) at T7.

At the step (704) the F/W is about to access the CR0 (210). When the "write (CR0)" function-call in (704) is called, it writes the CR0 (210) as follows. First, the F/W executes "suspend_timer( )" (721) to suspend the timer register count up. Next, the F/W reads the timer value (181) with "get_timer( )" at (722) and store it as local variable "T". In this case, the value is "T7". Then, the F/W writes the value of the CR0 (210) at the time of "T" by ordering I/O thread (220) via I/F logic (102) at (723). Finally, the F/W resumes the timer register (180) update with "resume_timer( )", and returns to the caller at (724).

At the step (723) above, the I/F communication function (220) writes CR0 (210) from 1 to 0. As a result, the value of out port (220) also changes from 1 to 0, so the co-simulation controller (501) suspends the CPU board (100) and activates the I/O thread (200) and the plant model (400) to update the state. The I/O thread (200) and the plant model (400) are now at T5 so it updates their components CR0 (210), CR1 (211), out port (220), in port (221), input (410) and output (411) from T5→T6→T7 step by step to follow the timing of CPU board (100). As a result, the value of the CR0 (210) and the input (410) changes from "1" to "0" at time of T7.

After the I/O thread (200) and the plant model (400) reaching to the time of T7, the co-simulation controller (501) suspends the I/O thread (200) and the plant model (400) and switches the CPU board (100) back to active again. The CPU board (100) executes the step (705) to jump back to the step (701) again as shown in FIG. 6(a) at T8.

As described in the example above, the actual CPU board can be used on behalf of the virtual SoC model, and can retrieve the same execution result compared to the virtual SoC model.

The example implementations described herein can thereby facilitate several advantages over the related art implementations. From a SoC model correctness point of view, the execution result of the test target F/W is exactly the same as the actual result because the test target F/W is running on the actual silicon CPU which is used with the product in the real world. Further, from a co-simulation execution performance point of view, the execution speed of the test target F/W is the same as that of in the real world which is, in general, much faster than that of in the virtual SoC model.

The example implementations thereby facilitate a new co-simulation methodology with higher accuracy and execution speed. It can be used by both software and hardware development scene and is not limited to the automotive area (e.g., firmware development and control logic design) because the co-simulation environment as described herein can be applied to any type of application software and/or hardware which has co-execution feature with certain I/F communication with others.

In the example implementations as described herein, there is a system which involves the actual CPU board including the CPU, memory, timer and I/F logic to execute the target F/W to be tested and to communicate with a Host PC outside of the CPU board, and the Host PC which involves an I/F to communicate with the CPU board above, and an I/O thread program which handles the actual communication between the CPU board and the Host PC, which can involve of I/F communication function, pseudo control registers, and input/output ports. The system further involves a plant model which emulates the behavior of the plant that cooperate with the F/W on the CPU board, and a co-simulation controller which manages the execution of the co-simulation of the whole system.

For the execution of the system in example implementations, the execution is facilitated such that when the F/W executed on the CPU board has an access to such control registers in the I/O thread, the CPU board communicate the I/O thread in the Host PC with the time of occurrence so that the I/O thread and plant model can emulate their logical behavior under the control of co-simulation controller until the time of such access occurrence.

Through the example implementations, several technical effects can be achieved, such as having the test target F/W executed on the actual CPU board instead of a virtual processor, so that the behavior of the F/W is exactly the same as the actual execution in the real world, and having the execution of the whole co-simulation run faster than that of the S-PILS system, because the F/W execution speed is exactly the same as in the real world and, in general, it is much faster than the virtual processor model which leads to more effective co-simulation execution than the related art implementations.

Further, through example implementations described herein and through the implementations as illustrated in FIGS. 1, and 5-7, the time synchronization issue between firmware and virtual plant model can thereby be resolved during co-simulation, even for when the plant model requires high-precision (e.g., execution at high speeds). Such example implementations can be suitable for high speed systems such as ADAS systems.

In addition, the example implementations described herein can resolve the time differences between the physical firmware and the simulation engine through the use of a physical CPU board in conjunction with the simulation engine and the timing synchronization as described herein. Through the example implementations described herein, the real-world execution speed of the F/W can be used in conjunction with the simulation engine.

Figure 8:
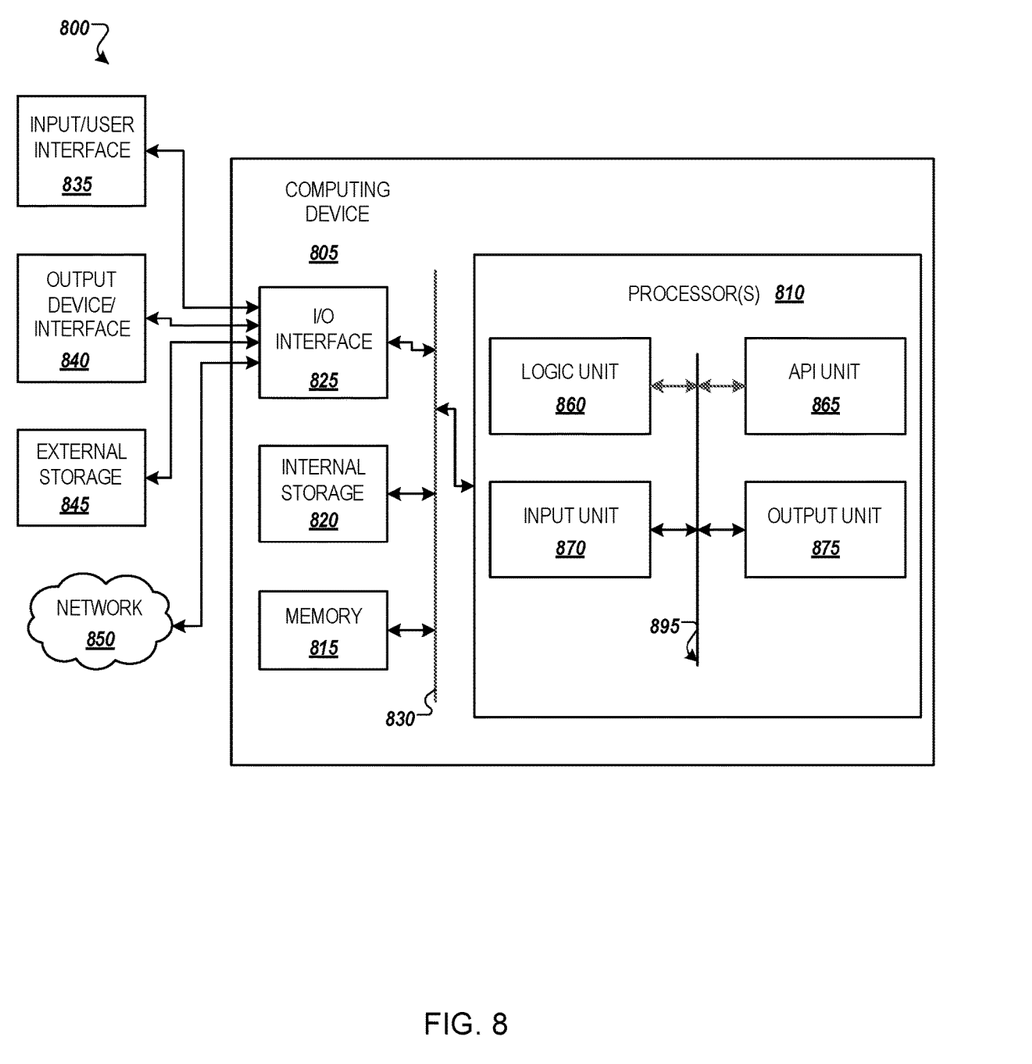
FIG. 8 illustrates an example computing environment with an example computer device suitable for use in some example implementations.

FIG. 8 illustrates an example computing environment with an example computer device suitable for use in some example implementations, such as a host computer (500) as illustrated in FIG. 1. Computer device (805) in computing environment 800 can include one or more processing units, cores, or processors (810), memory (815) (e.g., RAM, ROM, and/or the like), internal storage (820) (e.g., magnetic, optical, solid state storage, and/or organic), and/or IO interface (825), any of which can be coupled on a communication mechanism or bus (830) for communicating information or embedded in the computer device (805). I/O interface (825) is also configured to receive images from cameras or provide images to projectors or displays, depending on the desired implementation.

Computer device (805) can be communicatively coupled to input/user interface (835) and output device/interface (840). Either one or both of input/user interface (835) and output device/interface (840) can be a wired or wireless interface and can be detachable. Input/user interface (835) may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface (840) may include a display, television, monitor, printer, speaker, braille, or the like. In some example implementations, input/user interface (835) and output device/interface (840) can be embedded with or physically coupled to the computer device (805). In other example implementations, other computer devices may function as or provide the functions of input/user interface (835) and output device/interface (840) for a computer device (805).

Examples of computer device (805) may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device (805) can be communicatively coupled (e.g., via I/O interface (825)) to external storage (845) and network (850) for communicating with any number of networked components, devices, and systems, including one or more computer devices of the same or different configuration. Computer device (805) or any connected computer device can be functioning as, providing services of, or referred to as a server, client, thin server, general machine, special-purpose machine, or another label.

I/O interface (825) can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment (800). Network (850) can be any network or combination of networks (e.g., the Internet, local area network, wide area network, a telephonic network, a cellular network, satellite network, and the like).

Computer device (805) can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device (805) can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) (810) can execute under any operating system (OS) (not shown), in a native or virtual environment. One or more applications can be deployed that include logic unit (860), application programming interface (API) unit (865), input unit (870), output unit (875), and inter-unit communication mechanism (895) for the different units to communicate with each other, with the OS, and with other applications (not shown). The described units and elements can be varied in design, function, configuration, or implementation and are not limited to the descriptions provided.

Processor(s) (810) can be in the form of hardware processors such as central processing units (CPUs) or in a combination of hardware and software units.

In some example implementations, when information or an execution instruction is received by API unit (865), it may be communicated to one or more other units (e.g., logic unit (860), input unit (870), output unit (875)). In some instances, logic unit (860) may be configured to control the information flow among the units and direct the services provided by API unit (865), input unit (870), output unit (875), in some example implementations described above. For example, the flow of one or more processes or implementations may be controlled by logic unit (860) alone or in conjunction with API unit (865). The input unit (870) may be configured to obtain input for the calculations described in the example implementations, and the output unit (875) may be configured to provide output based on the calculations described in example implementations.

As described herein, host computer (500) can be connected via the I/F path (110) as described herein to the CPU board as illustrated in FIG. 1. As illustrated in FIG. 1, the CPU board (100) can involve a memory (104) configured to store firmware; a CPU (101) configured to execute the firmware; and a timer (103) configured to calculate event occurrence timing during execution of the firmware. The I/F path (110) can be facilitated by a physical concrete I/F connection, such as by UART serial communication.

Processor(s) (810) can be configured to facilitate the functions of the co-simulation controller (501), the I/O thread (200) and the plant model (400), and can execute a virtual plant model (400) on a simulation engine as described herein and as illustrated in FIG. 1. In example implementations, the firmware is configured to control the virtual plant model through the timer (103) as illustrated in FIGS. 6(*a*) to 6(*c*) to suspend and reactivate the simulation of the plant model (400). Processor(s) (810) and the CPU (101) are configured to synchronize with the event occurrence timing calculated by the timer (103) to execute co-simulation between the virtual plant model and the firmware as illustrated in the timing chart of FIG. 7.

As shown in FIGS. 6(*a*) to 6(*c*) and FIG. 7 the processor(s) (810) and the CPU (101) are configured to synchronize with the event occurrence timing calculated by the timer to execute co-simulation between the virtual plant model and the firmware by execution of the firmware by the CPU until the event occurrence timing is reached at (701); transmission of the event occurrence timing from the CPU board to the host computer via the I/F to control the virtual plant model to execute as illustrated by the get_timer( ) function of FIGS. 6(*a*) to 6(*c*); execution of the virtual plant model on the simulation engine by the processor until the event occurrence timing is reached as illustrated at (713) and (723) of FIGS. 6(*b*) and 6(*c*); synchronization of the virtual plant model with the firmware as illustrated FIG. 7 and as illustrated at (713) and (723) of FIGS. 6(*b*) and 6(*c*); and calculation of a next event occurrence timing by the timer as illustrated at (714) and (724) of FIGS. 6(*b*) and 6(*c*).

As illustrated in FIG. 7 and at (711), (721) of FIGS. 6(*b*) and 6(*c*), the execution of the virtual plant model on the simulation engine by the processor is suspended until the execution of the firmware by the CPU is completed to the event occurrence timing; and after the event occurrence timing is reached by the firmware, the execution of the firmware is suspended until the synchronization.

As illustrated in FIG. 5 and (701)-(704) of FIG. 6(*a*), the timer is configured to calculate event occurrence timing during execution of the firmware by execution of an interrupt on the timer upon occurrence of an I/O access function call or a read/write access to control registers until a return is received from the host computer. In the example of FIG. 6(a), the read/write access to control registers is illustrated, but such implementations can also be provided for an I/O access function call or for any implementation for when the firmware requires input from the plant model to transition from one state to another state, depending on the desired implementation.

As illustrated in the hardware diagram of the timer of FIG. 5, the timer can involve a hardware interrupt configured to execute the interrupt through RST (184), EN (185) and selector 183, the hardware interrupt configured to receive a signal such as RST 184 and EN 185 from the host computer over the I/F to resume the timer.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Embodiments may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the embodiments are not described with reference to any particular programming language. It will be appreciated that a variety of programming languages may be used to implement the teachings of the embodiments as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the embodiments may be implemented using circuits and logic devices (hardware), while other aspects may be implemented using instructions stored on a machine-readable medium (software), which if executed by a processor, would cause the processor to perform a method to carry out implementations of the present application. Further, some embodiments of the present application may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other embodiments of the present application will be apparent to those skilled in the art from consideration of the specification and practice of the teachings of the present application. Various aspects and/or components of the described embodiments may be used singly or in any combination. It is intended that the specification and embodiments be considered as examples only, with the true scope and spirit of the present application being indicated by the following claims.

What is claimed is:

1. A co-simulation platform system, comprising:
a central processing unit (CPU) board comprising:
   a memory configured to store firmware;
   a CPU configured to execute the firmware; and
   a timer configured to calculate event occurrence timing during execution of the firmware;
and
a host computer connected to the CPU board via an interface (I/F), the host computer comprising:
   a processor configured to execute a virtual plant model on a simulation engine;
wherein the firmware is configured to control the virtual plant model;
wherein the processor and the CPU are configured to synchronize with the event occurrence timing calculated by the timer to execute co-simulation between the virtual plant model and the firmware;
   wherein the processor and the CPU are configured to synchronize with the event occurrence timing calculated by the timer to execute co-simulation between the virtual plant model and the firmware by:
   execution of the firmware by the CPU until the event occurrence timing is reached;
   transmission of the event occurrence timing from the CPU board to the host computer via the I/F to control the virtual plant model to execute;
   execution of the virtual plant model on the simulation engine by the processor until the event occurrence timing is reached;
   synchronization of the virtual plant model with the firmware; and
   calculation of a next event occurrence timing by the timer.

2. The system of claim 1, wherein the execution of the virtual plant model on the simulation engine by the processor is suspended until the execution of the firmware by the CPU is completed to the event occurrence timing; and after the event occurrence timing is reached by the firmware, the execution of the firmware is suspended until the synchronization.

3. The system of claim 1, wherein the timer is configured to calculate event occurrence timing during execution of the firmware by execution of an interrupt on the timer upon occurrence of an I/O access function call or a read/write access to control registers until a return is received from the host computer.

4. The system of claim 1, wherein the timer comprises a hardware interrupt configured to execute the interrupt, the hardware interrupt configured to receive a signal from the host computer over the I/F to resume the timer.

5. The system of claim 1, wherein the event occurrence timing is a timing to transition the firmware from one state to another state.

6. The system of claim 1, further comprising a universal asynchronous receiver-transmitter (UART) serial communication configured to facilitate the I/F.

7. A host computer connected, via an interface (I/F) to a central processing unit (CPU) board comprising a memory configured to store firmware, a CPU configured to execute the firmware, and a timer configured to calculate event occurrence timing during execution of the firmware, the host computer comprising:
   a processor configured to execute a virtual plant model on a simulation engine;
   wherein the firmware is configured to control the virtual plant model;
   wherein the processor and the CPU are configured to synchronize with the event occurrence timing calculated by the timer to execute co-simulation between the virtual plant model and the firmware;
   wherein the processor and the CPU are configured to synchronize with the event occurrence timing calculated by the timer to execute co-simulation between the virtual plant model and the firmware by:
   execution of the firmware by the CPU until the event occurrence timing is reached;
   transmission of the event occurrence timing from the CPU board to the host computer via the I/F to control the virtual plant model to execute;
   execution of the virtual plant model on the simulation engine by the processor until the event occurrence timing is reached;
   synchronization of the virtual plant model with the firmware; and
   calculation of a next event occurrence timing by the timer.

8. The host computer of claim 7, wherein the execution of the virtual plant model on the simulation engine by the processor is suspended until the execution of the firmware by the CPU is completed to the event occurrence timing; and
   after the event occurrence timing is reached by the firmware, the execution of the firmware is suspended until the synchronization.

9. The host computer of claim 7, wherein the timer is configured to calculate event occurrence timing during execution of the firmware by execution of an interrupt on the timer upon occurrence of an I/O access function call or a read/write access to control registers until a return is received from the host computer.

10. The host computer of claim 7, wherein the timer comprises a hardware interrupt configured to execute the interrupt, the hardware interrupt configured to receive a signal from the host computer over the I/F to resume the timer.

11. The host computer of claim 7, wherein the event occurrence timing is a timing to transition the firmware from one state to another state.

12. The host computer of claim 7, wherein a universal asynchronous receiver-transmitter (UART) serial communication is configured to facilitate the I/F.

\* \* \* \* \*